United States Patent [19]

Stemme

[11] 4,269,908
[45] May 26, 1981

[54] BATTERY MOUNTING CHAMBER FOR A POCKET CALCULATOR

[75] Inventor: Walter Stemme, Sulzbach, Fed. Rep. of Germany

[73] Assignee: Braun AG, Kronberg, Fed. Rep. of Germany

[21] Appl. No.: 88,668

[22] Filed: Oct. 26, 1979

[30] Foreign Application Priority Data

Oct. 26, 1978 [DE] Fed. Rep. of Germany ... 7831842[U]

[51] Int. Cl.³ .............................................. H01M 2/10
[52] U.S. Cl. ..................................... 429/98; 429/99; 429/100
[58] Field of Search ................ 429/98, 99, 100, 96, 429/97; 58/23 BA; 206/333

[56] References Cited

U.S. PATENT DOCUMENTS

| 4,008,356 | 2/1977 | Asano | 429/98 |
| 4,138,531 | 2/1979 | Thompson | 429/98 |
| 4,206,274 | 6/1980 | Peels | 429/99 |

*Primary Examiner*—Charles F. LeFevour
*Attorney, Agent, or Firm*—Sughrue, Rothwell, Mion, Zinn and Macpeak

[57] ABSTRACT

A support body 6 having recessed trays 3, 4 for accommodating button batteries 28 is outwardly rotatable from a pocket calculator housing 8 through the sliding of a T-sectioned curved extension 7 of the body around a cylindrical pivot face 9 integral with the housing. The free end of the extension has a transverse crossbar 11 that abuts inwardly extending stop ribs 12 on the housing to limit the rotation of the body 6 and to prevent it from becoming completely detached from the housing.

3 Claims, 4 Drawing Figures

BATTERY MOUNTING CHAMBER FOR A POCKET CALCULATOR

BACKGROUND OF THE INVENTION

The invention relates to a battery mounting chamber for a pocket calculator.

With known pocket calculators and table clocks the battery chamber is part of the housing. The chamber is closed by a lid anchored to the housing by a snap device. Such battery chambers have the disadvantage that the lid may be lost since it is a separate piece, and that the snap device tends to open accidentally when jarred, especially if it is made of plastic. The relatively large area needed for the chamber and its lid is another disadvantage of the known chamber construction. Finally some of the known battery chambers are so constructed as to allow the batteries to be wrongly inserted, i.e. the batteries can be inserted with reverse polarity.

SUMMARY OF THE INVENTION

The object of the present invention is to provide a battery chamber with no loose parts which assures correct polarity when the batteries are inserted, prevents accidental opening, and minimizes space requirements for the chamber. The invention provides for this through the following features:

The batteries can be inserted into trays arranged on a side surface of an otherwise parellel-surfaced support body;

The support body is provided with a hook-shaped extension on one of its ends which at least partially extends around an essentially cylindrical pivot face provided on the device housing; and The support body extension has a T-shaped cross-section whose free end carries a transverse cross-bar which engages stop tabs on the housing, to thereby limit the outward rotation of the body.

The battery trays have a depression corresponding in size to that of the batteries, and each tray bottom has an opening through which stationary and springy contact strips extend which engage the battery poles.

Along the narrow side of the support body opposite the extension a lock molding is provided. The invention provides for lock edges formed on the free end of the support body opposite the hook-shaped extension.

BRIEF DESCRIPTION OF THE DRAWINGS

FIG. 4 shows the top view of one end of the pocket calculator with the battery support swung in.

DETAILED DESCRIPTION OF THE PREFERRED EMBODIMENT

Figure 1:
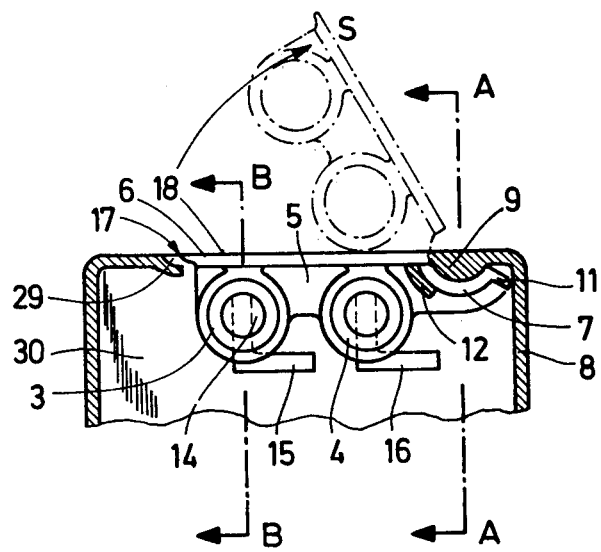
FIG. 1 shows a section through one end of a pocket calculator housing having a hinged battery support according to the invention.

The battery chamber comprises a parallel surfaced support body 6, whose one side 5 contains insert trays 3, 4 in which a pair of "button" batteries 28 are placed. Each tray 3, 4 has a bottom opening 14 as shown in FIG. 3, through which stationary spring strips 15, 16 extend to electrically contact the batteries 28.

The support body 6 has a curved, hook-shaped extension 7 on its one end which partially extends around an essentially cylindrical pivot face 9 provided on the housing 8. The extension 7 of the support body 6 has, as shown in FIG. 2, a T-shaped cross-section, and the free end of the extension is provided with a transverse crossbar 11 which engages guiding stop tabs 12 extending under the extension and integral with the housing 8. The trays 3, 4 which hold the batteries 28 have pockets indented to a depth t, which corresponds to the thickness of the batteries. The support body 6 is provided with a molding 17 along its narrow side 18 opposite the extension 7, and the housing 8 of the pocket calculator is provided with a bead 29 which matingly engages the molding. A snap fit to close the support body 6 is implemented by finger tabs 21 on the body.

The support body can be rotated in the direction of the arrow S around the pivot face 9 until the crossbar 11 contacts the stop tabs 12, at which point both of the trays 3, 4 lie completely outside the housing to enable the easy insertion or removal of the batteries 28. The housing 8 necessarily comprises two molded halves, although this is not shown in the drawings. Both housing halves are glued, welded, or screwed together after the support body 6 is inserted, so that the support body cannot be lost or detached and yet is still rotatable in relation to the housing. The spring force of the contact strips 15, 16 exerted crosswise to the housing i.e. in the direction of arrow K on the batteries 28, prevents any unwanted rotation of the support body 6 relative to the housing while the batteries are being inserted.

Figures 2, 3:
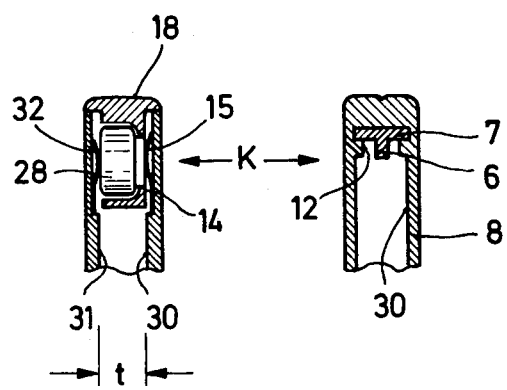
FIG. 2 shows a section taken along line A—A in FIG. 1.
FIG. 3 shows a section taken along lines B—B in FIG. 1.
Figure 4:
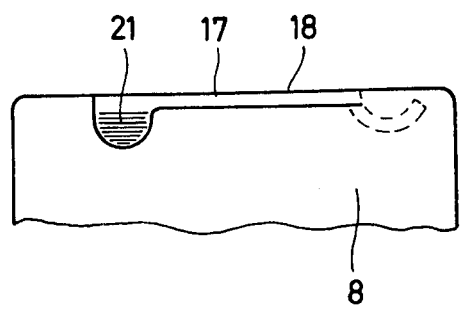

As shown in FIG. 3, contact strips 15, 16 are situated not only on the one inner surface 30 of the housing 8, but also on the opposite inner surface 31. One of the contact strips 32 lying diametrically opposite the contact strip 15 is visible in the cross-section shown in FIG. 3.

What is claimed is:

1. A battery mounting chamber for a pocket calculator characterized by:
    (a) a pair of battery insert trays (3, 4) attached to a side surface (5) of an otherwise parallel surfaced support body (6),
    (b) a hook-shaped extension (7) on one end of the support body which at least partially fits around a cylindrical pivot face (9) formed on a housing (8), and
    (c) the support body extension having a T-shaped cross-section and the free end of the extension having a transverse crossbar (11) engagable with at least one stop tab (12) running crosswise to the support body and integral with the housing, whereby the support body may be rotated out of the housing about the pivot face to expose the trays for battery insertion or removal.

2. A battery mounting chamber as defined in claim 1, wherein the trays define recessed pockets having a depth (t), equal to the thickness of the batteries, and each tray has a bottom opening (14) through which spring strips (15, 16) extend to electrically contact the batteries.

3. A battery mounting chamber as defined in claims 1 or 2, wherein the support body has a closure molding (17) on its narrow end opposite the extension (7).

* * * * *